United States Patent
Miyazawa et al.

(10) Patent No.: US 9,502,741 B2
(45) Date of Patent: Nov. 22, 2016

(54) AIR BATTERY AND BATTERY PACK USING SAME

(71) Applicant: NISSAN MOTOR CO., LTD., Kanagawa (JP)

(72) Inventors: Atsushi Miyazawa, Kamakura (JP); Keita Iritsuki, Yokohama (JP); Tomokatsu Himeno, Yokohama (JP); Yoshiko Tsukada, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 110 days.

(21) Appl. No.: 14/373,935

(22) PCT Filed: Jan. 21, 2013

(86) PCT No.: PCT/JP2013/051084
§ 371 (c)(1),
(2) Date: Jul. 23, 2014

(87) PCT Pub. No.: WO2013/111702
PCT Pub. Date: Aug. 1, 2013

(65) Prior Publication Data
US 2015/0037693 A1    Feb. 5, 2015

(30) Foreign Application Priority Data

Jan. 25, 2012 (JP) ................. 2012-012966
Jan. 18, 2013 (JP) ................. 2013-007478

(51) Int. Cl.
*H01M 12/06* (2006.01)
*H01M 12/08* (2006.01)
*H01M 2/02* (2006.01)
*H01M 2/14* (2006.01)

(52) U.S. Cl.
CPC .............. *H01M 12/06* (2013.01); *H01M 2/025* (2013.01); *H01M 2/14* (2013.01); *H01M 12/065* (2013.01); *H01M 12/08* (2013.01)

(58) Field of Classification Search
None
See application file for complete search history.

(56) References Cited

U.S. PATENT DOCUMENTS

| 4,988,581 A | 1/1991 | Wycliffe |
| 6,248,476 B1 | 6/2001 | Sun et al. |
| 2004/0157101 A1 | 8/2004 | Smedley |
| 2010/0330437 A1* | 12/2010 | Burchardt ............ H01M 8/184 429/406 |
| 2012/0021303 A1* | 1/2012 | Amendola ............ H01M 4/42 429/406 |
| 2012/0321968 A1 | 12/2012 | Sato et al. |

FOREIGN PATENT DOCUMENTS

| CN | 2365765 Y | 2/2000 |
| EP | 2757629 A1 | 7/2014 |

(Continued)

OTHER PUBLICATIONS

Machine translation of JP 57-023479, Feb. 1982.*

*Primary Examiner* — Jonathan Crepeau
(74) *Attorney, Agent, or Firm* — Young Basile Hanlon & MacFarlane, P.C.

(57) ABSTRACT

An air battery for use by being stacked in a battery pack has a cathode constituting member and an anode material adapted such that at least a part of the anode material is brought into direct contact with a cathode constituting member of another air battery. In this configuration, it is possible to eliminate the need to use an anode cap for sealing on the anode side and thereby possible to achieve not only reduction in weight and size but also reduction in cost.

5 Claims, 5 Drawing Sheets

(56) References Cited

FOREIGN PATENT DOCUMENTS

| EP | 2808938 | A1 | 12/2014 |
|---|---|---|---|
| JP | S5723479 | A | 2/1982 |
| JP | 57-121080 | U | 7/1982 |
| JP | 2000-067824 | A | 3/2000 |
| JP | 2000-067937 | A | 3/2000 |
| WO | 03090294 | A2 | 10/2003 |
| WO | 2011-087089 | A1 | 7/2011 |

* cited by examiner ized as a battery pack B having three air batteries: two air batteries A1 and A1, each of which is according to the first embodiment of the present invention, and one air battery A0 vertically stacked together.

AIR BATTERY AND BATTERY PACK USING SAME

CROSS REFERENCE TO RELATED APPLICATIONS

The present application claims priority to Japanese Patent Application Nos. 2012-012966, filed Jan. 25, 2012 and 2013-007478, filed Jan. 18, 2013, each incorporated herein in its entirety.

TECHNICAL FIELD

The present invention relates to an air battery and a battery pack having air batteries stacked together.

BACKGROUND

Japanese Laid-Open Patent Publication No. 2000-67824 discloses the use of air batteries as a so-called battery pack. More specifically, the battery pack of Japanese Laid-Open Patent Publication No. 2000-67824 has three button-type air batteries vertically connected in series and placed in a metal exterior can, with an insulating sheet interposed between the air batteries and the exterior can, such that the air batteries are insulated from the exterior can by the insulating sheet.

Each of the air batteries includes: a cathode can formed of a metal material in a bottomed-cylindrical shape with one end open and storing therein an anode active material e.g. zinc and an electrolyte e.g. aqueous potassium hydroxide solution; and an anode cap closing the open end of the cathode can.

In the battery pack of Japanese Laid-Open Patent Publication No. 2000-67824, however, the weight ratio of the anode plate (anode cap) is large. This causes unsolved problems such as difficulty in weight reduction and hindrance to size reduction.

SUMMARY

In view of the foregoing, it is an object of the present invention to provide an air battery with no structural part corresponding to the anode cap so as to achieve not only reduction in weight and size but also reduction in cost. It is also an object of the present invention to provide a battery pack using such an air battery.

As a solution to the above-mentioned problems, there is provided according to one aspect of the present invention an air battery for use by being stacked in a battery pack, comprising an anode material and a cathode constituting member with a conductive fluid-tight air-permeable film, wherein the anode material of the air battery is adapted such that at least a part of the anode material of the air battery is brought into direct contact with a conductive fluid-tight air-permeable film of a cathode constituting member of another air battery adjacent thereto. In this configuration, the air battery can establish electrical conduction between the adjacent air batteries, without the use of the anode material and the structural part corresponding to the anode cap, and achieve not only reduction in weight and size but also reduction in cost.

It is possible in the present invention to eliminate the need for the structural part corresponding to the conventional anode cap and achieve not only reduction in weight and size but also reduction in cost.

DESCRIPTION OF EMBODIMENTS

Figure 1:
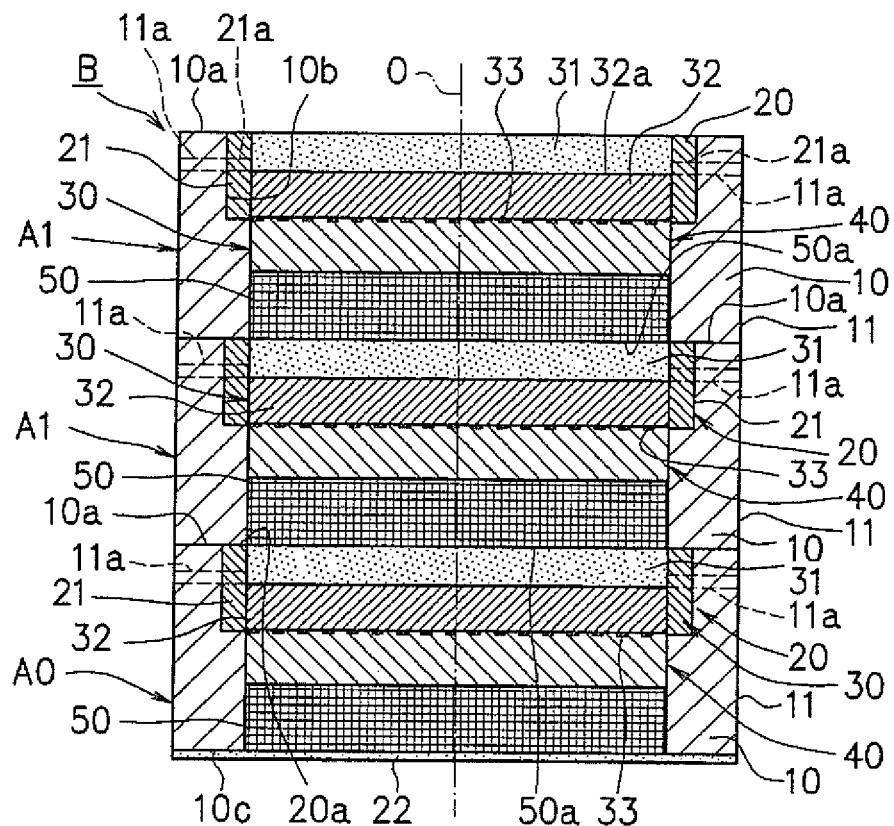
FIG. 1 is a cross-section view of a battery pack using an air battery according to a first embodiment of the present invention.

Hereinafter, embodiments of the present invention will be described below with reference to the drawings. FIG. 1 is a cross-section view of a battery pack using an air battery according to the first embodiment of the present invention.

As shown in FIG. 1, the battery pack is exemplified as a battery pack B having three air batteries: two air batteries A1 and A1, each of which is according to the first embodiment of the present invention, and one air battery A0 vertically stacked together.

The air battery A1 according to the first embodiment includes a frame member 10, a contact member 20, a cathode constituting member 30, an electrolyte and separator layer 40 and an anode material 50. In the first embodiment, the frame member 10 is made of an electrolyte-resistant resin such as polypropylene (PP) or engineering plastic material and exhibits electrical insulation properties. As the material of the frame member 10, there can alternatively be used a fiber-reinforced plastic material (FRP) in which reinforcing fibers such as carbon fibers or glass fibers are mixed to ensure mechanical strength. The use of the electrolyte-resistant resin such as polypropylene (PP) or engineering plastic material leads to weight reduction. It should however be noted that it is essential for the frame member 10 to exhibit electrical insulation properties as mentioned above in the first embodiment. The term "electrolyte" herein refers to an aqueous or non-aqueous solution containing potassium hydroxide (KOH) or chloride as a main component.

In the first embodiment, the frame member 10 is cylindrical is shape with both ends open. An engagement portion 10b is provided around the entire inner circumferential edge part of one open end face (upper end face) 10a of the frame member 10 for engagement of the contact member 20 (explained in detail later).

Air flow holes 11a are made in a circumferential wall 11 of the frame member 10, at a height position facing the after-mentioned fluid-tight air-permeable film 31 and at predetermined angular intervals about the axis O, so as to provide air communication between the inside and outside of the circumferential wall 11. The engagement portion 10b is formed as a step with an inner diameter equal to an outer diameter of the contact member 20 and a height substantially equal to a height of the contact member 20.

The contact member 20 is made of a conductive metal material and brought into electrical conduction with the after-mentioned fluid-tight air-permeable film 31 and with the after-mentioned cathode material 32 and into contact with the frame member 10 of the another adjacent (upper-side) air battery A1.

In the first embodiment, the contact member 20 has a ring shape with an outer diameter engageable in the engagement portion 10b and a height that makes its end face flush with the open end face 10a of the frame member 10 by engagement of the contact member 20 in the engagement portion 10b.

Air flow holes 21a are made in a circumferential wall 21 of the contact member 20, at a height position facing the air flow holes 11a and at the same angular intervals as the air flow holes 11a, so as to provide air communication between the inside and outside of the circumferential wall 21.

In the first embodiment, the cathode constituting member 30 is provided with a fluid-tight air-permeable film 31, a cathode material 32 and a collector 33. Herein, the cathode constituting member 30 has a conductive layer structure containing a catalyst for oxygen reduction reaction of the cathode material 32 and a conduction path forming material such as carbon powder. A binder may also be used to form the catalyst and the carbon powder into a layer shape.

The fluid-tight air-permeable film 31 exhibits conductivity in addition to fluid tightness and air permeability. The fluid-tight air-permeable film 31 is formed with a plurality of fine pores for gas supply (air supply) to the cathode material and is made of a fluoro resin, etc. capable of preventing the electrolyte from leaking to the outside. In the first embodiment, the fluid-tight air-permeable film 31 has a circular shape, when viewed in plane, with an outer diameter equal to an inner diameter of the contact member 20. In other words, the fluid-tight air-permeable film 31 is adapted to cover an outer surface 32a of the cathode material 32. The fluid-tight air-permeable film 31 has the feature of allowing a flow of gas such as air by its air permeability while blocking a flow of fluid by its fluid tightness or water tightness.

The collector 33 is formed as an apertured conductive body of stainless steel, Cu, Ni, carbon or the like. The aperture rate of the collector 33 can be set as appropriate depending on the conductivity of the cathode material 32. In the case of using a wire mesh as the collector 33, for example, the aperture rate of the collector 33 is set equivalent to 50 to 600 mesh. There can alternatively be used a carbon paper as the collector 33.

In the first embodiment, the collector 33 has a circular shape with an outer diameter equal to the inner diameter of the contact member 20 when viewed in plan. For example, the collector 33 is in the form of a conductive wire mesh whose apertures are sized to allow a flow of ions there through. The arrangement of the collector 33 leads to improvement in conductivity and mechanical strength.

The cathode material 32 is a conductive porous material containing a catalyst. For example, the cathode material 32 is in the form of a porous body prepared from a carbon material and a binder resin and carrying therein a catalyst such as manganese dioxide.

The anode material 50 is a pure metal such as Li, Al, Fe, Zn or Mg or an alloy containing one or more of such metals as a main component and is adapted such that a part or the whole of the anode material 50 is brought into direct contact with the cathode constituting member 30 of the another adjacent air battery A1. In the case of placing the air battery A0 at the lowermost position and stacking two air batteries A1 on the air battery A0 as shown in FIG. 1, the entire lower surface of the anode material 50 of the upper-side air battery A1 faces the conductive fluid-tight air-permeable film 31 of the cathode constituting member 30 of the lower-side air battery A1 or A0. Accordingly, the upper-side air battery A1 and the lower-side air battery A1 or A0 are electrically conducted and connected in series to each other when at least the part of the anode material 50 of the upper-side air battery A1 is brought into press contact with the fluid-tight air-permeable film 31 of the cathode constituting member 30 of the lower-side air battery A1 or A0 as will be explained later.

In the first embodiment, the anode material 50 has a plate shape with an outer diameter equal to an inner diameter of the frame member 10 and a height that allows the lower surface 50a of the anode material 50 to be flush with or slightly protrude toward the lower side from the lower end face 10c of the frame member 10. This eliminates the need for a conventionally required collector plate like a collector plate 22 of the lowermost-side air battery A0 of FIG. 1.

The air battery A0 is structurally the same as the air battery A1 except that the collector plate 22 is arranged on the lower end face 10c of the frame member 10. The other parts and portions of the air battery A0 are the same as those of the air battery A1 and thus are designated by the same reference numerals in FIG. 1 to omit repeated explanations thereof.

The collector plate 22 is made of a conductive material capable of preventing the electrolyte from leaking to the cartridge outside. As such a material, there can be used stainless steel, copper (alloy) or a metal material having a surface coated with a plating of corrosion resistant metal.

Next, the assembling of the above-mentioned air batteries into the battery pack B will be explained below. When the air battery A1 is stacked on the lowermost-side air battery A0, the upper end face 20a of the contact member 20 and the upper end face 10a of the frame member 10 of the air battery A0 are brought into contact with the lower end face 10c of the frame member 10 of the air battery A1.

Simultaneously, the lower surface 50a of the anode material 50 of the air battery A1 is brought into intimate contact with and into electrical conduction with the fluid-tight air-permeable film 31 of the air battery A0. By this, the upper-side air battery A1 and the lower-side air battery A0 are connected in series to each other. Each of these air batteries easily allows a flow of air since the air flow holes 11a and 21a are made in the frame member 10 and the contact member 20, respectively.

When the another air battery A1 is stacked on this air battery A1, the upper end face 20a of the contact member 20 and the upper end face 10a of the frame member 10 of the lower-side air battery A1 are brought into contact with the lower end face 10c of the frame member 10 of the upper-side air battery A1. Simultaneously, the lower surface 50a of the anode material 50 of the upper-side air battery A1 is brought into intimate contact with and into electrical conduction with the fluid-tight air-permeable film 31 of the lower-side air battery A1. By this, the upper-side air battery A1 and the lower-side air battery A1 are connected in series to each other. As in the above case, each of these air batteries easily allows a flow of air since the air flow holes 11a and 21a are made in the frame member 10 and the contact member 20, respectively.

In the above configuration, the conductive fluid-tight air-permeable film 31 is utilized so as to secure a large contact surface with the anode material. This leads to reduction in electrical resistance at a contact interface between the anode material and the fluid-tight air-permeable film. This also enables monitoring of the degree of wear of the anode material as a voltage change occurs in response to a change of anode surface area in current-controlled operation.

As explained above, there is no need to use any structural part corresponding to the conventional anode cap for sealing. There is also no need to provide the collector plate 20 in the air battery A1 as is different from the air battery A0. It is therefore possible to achieve not only reduction in weight and size but also reduction in cost and facilitate battery assembling due to the reduction of parts count.

Figure 2:
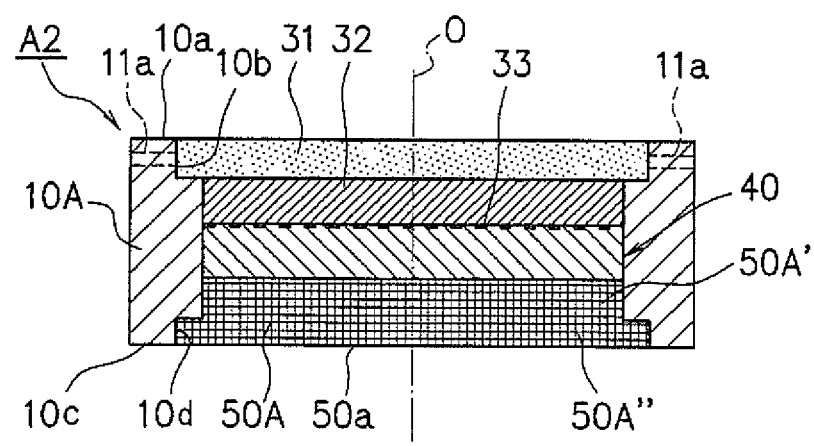
FIG. 2 is a cross-section view of an air battery according to a second embodiment of the present invention.

Next, an air battery according to the second embodiment of the present invention will be explained below with reference to FIG. 2. FIG. 2 is a cross-section view of the air battery according to the second embodiment of the present invention. In the second embodiment, parts and portions that are the same as or similar to those in the above embodiment are designated by the same or similar reference numerals to avoid repeated explanations thereof.

The air battery A2 according to the second embodiment has a frame member and an anode material that are of different shapes. The anode material 50A includes a small-diameter region 50A' made equal in diameter to an inner diameter of the frame member 10A and a large-diameter region 50A" made larger in diameter than the small-diameter region 50A'.

The frame member 10A is cylindrical in shape with both ends open. An engagement portion 10*b* is provided around the entire inner circumferential edge part of one open end face (upper end face) 10*a* of the frame member 10 for engagement of the conductive fluid-tight air-permeable film 31.

Another engagement portion 10*d* is provided around the entire inner circumferential edge part of the other open end face (lower end face) 10*c* of the frame member 10 for engagement of the large-diameter region 50A" of the anode material 50A. Further, the anode material 50A is adapted such that the entire lower surface of the anode material 50A is brought into direct contact with a cathode constituting member 30 of another adjacent air battery A1 and, more specifically, brought into direct contact with a fluid-tight air-permeable film 31 of the cathode constituting member 30 of the another adjacent air battery A1.

In the above configuration, the conductive fluid-tight air-permeable film 31 is utilized so as to secure a large contact surface with the anode material as in the case of the first embodiment. This leads to reduction in electrical resistance at a contact interface between the anode material and the fluid-tight air-permeable film. This also enables monitoring of the degree of wear of the anode material as a voltage change occurs in response to a change of anode surface area in current-controlled operation.

Figure 3:
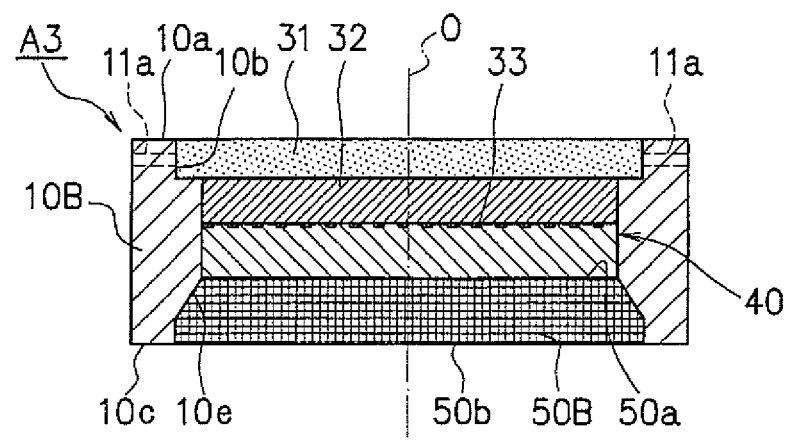
FIG. 3 is a cross-section view of an air battery according to a third embodiment of the present invention.

An air battery according to the third embodiment of the present invention will be explained below with reference to FIG. 3. FIG. 3 is a cross-section view of the air battery according to the third embodiment of the present invention. In the third embodiment, parts and portions that are the same as or similar to those in the above-mentioned embodiments are designated by the same or similar reference numerals to avoid repeated explanations thereof.

The air battery A3 according to the third embodiment has a frame member and an anode material that are of different shapes as in the case of the second embodiment. The anode material 50B has a substantially trapezoidal cross-sectional area gradually increasing from an upper surface 50*a* to the vicinity of a lower surface 50*b* thereof. Further, the anode material 50B is adapted such that the entire lower surface of the anode material 50A is brought into direct contact with a cathode constituting member 30 of another adjacent air battery A3 and, more specifically, brought into direct contact with a fluid-tight air-permeable film 31 of the cathode constituting member 30 of the another adjacent air battery A3.

The frame member 10B is cylindrical in shape with both ends open. An engagement portion 10*e* is provided around the entire inner circumferential edge part of one open end face (lower end face) 10*b* of the frame member 10 for engagement of the anode material 50B. In the above configuration, it is possible for the air battery A3 to obtain the same effects as those of the air battery A2.

Figure 4:
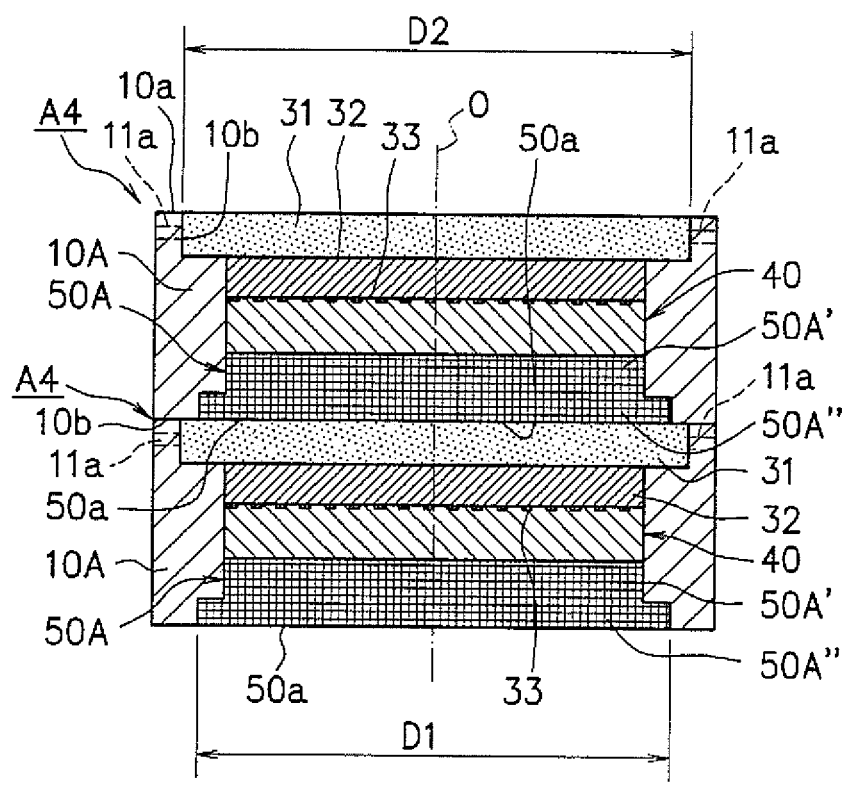
FIG. 4 is a cross-section view of a stack of two air batteries, each of which is according to a fourth embodiment of the present invention.

An air battery according to the fourth embodiment of the present invention will be explained below with reference to FIG. 4. FIG. 4 is a cross-section view of a stack of two air batteries according to the fourth embodiment of the present invention. In the fourth embodiment, parts and portions that are the same as or similar to those in the above-mentioned embodiments are designated by the same or similar reference numerals to avoid repeated explanations thereof.

The air battery A4 according to the fourth embodiment has an anode material 50A and a conductive fluid-tight air-permeable film 31 formed with an outer diameter D2 larger than an outer diameter D1 of the anode material 50A. This enables the fluid-tight air-permeable film 31, which is larger in size than the anode material 50A, to perform a seal function even when perforation occurs of the anode material 50A by dissolution during continuous use.

Figure 5:
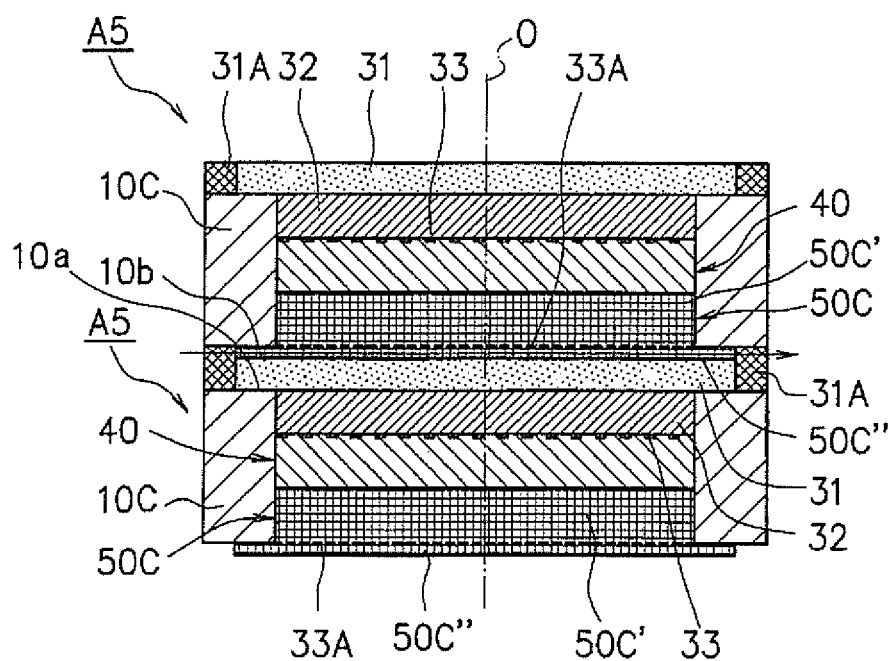
FIG. 5 is a cross-section view of a stack of two air batteries, each of which according to a fifth embodiment of the present invention.

An air battery according to the fifth embodiment of the present invention will be explained below with reference to FIG. 5. FIG. 5 is a cross-section view of a stack of two air batteries according to the fifth embodiment of the present invention. In the fifth embodiment, parts and portions that are the same as or similar to those in the above-mentioned embodiments are designated by the same or similar reference numerals to avoid repeated explanations thereof.

The air battery A5 according to the fifth embodiment has a conductive fluid-tight air-permeable film 31 and an anode material 50C adapted to, when the fluid-tight air-permeable film 31 of the air battery A5 is brought into contact with the anode material 50C of the another adjacent air battery A5, form an air flow path for air flow at a contact interface there between (as indicated by an arrow).

Although not shown in FIG. 5, the air flow path is formed by making a groove in the contact surface (particularly, surface 50") of the anode material 50C or by making a groove in the contact surface of the fluid-tight air-permeable film 31.

The air battery A5 has a frame member 10C of cylindrical or rectangular shape with both ends open. Herein, the cross-section view of FIG. 5 is based on the premise that the frame member 10C is rectangular in shape (the same applies to the following). No engagement portions are provided around inner circumferential edge parts of both end faces of the frame member 10. The anode material 50C has a small-diameter region 50C' made equal in outer diameter to an inner diameter of the frame member 10C and a large-diameter region 50C" ranging in outer diameter between inner and outer diameters of the frame member 10C.

The large-diameter region 50C" is interposed between the two adjacent air batteries A5 and A5 and, more specifically, between the lower end face 10b of the frame member 10C of the upper-side air battery A5 and the upper end face 10a of the frame member 10C of the lower-side air battery A5 for the formation of the air flow path.

The air battery A5 also has a collector 33A of the same type as the collector 33. The collector 33A is arranged at an interface between the small-diameter region 50C' and the large-diameter region 50C", that is, at a height position substantially flush with the lower end face 10b of the frame member 10C.

Further, the air battery A5 has a fluid-tight air-preferable film 31A of higher air permeability than the fluid-tight air-permeable film 31. The fluid-tight air-permeable film 31A is disposed on inlet and outlet of the air flow path. In the fifth embodiment, the fluid-tight air-preferable film 31A has an inner diameter equal to an outer diameter of the fluid-tight air-preferable film 31 and an outer diameter equal to an outer diameter of the frame member 10C.

In the above configuration, the fluid-tight air-preferable film 31A serves as a fluid sealing member on the inlet and outlet of the air flow path. In a state where the anode material 50C is brought into direct contact with the fluid-tight air-permeable film 31 with the use of no collector plate, there may occur leakage of the electrolyte due to dissolution and perforation of the anode material 50C. Even in such a case, the fluid-tight air-preferable film 31A prevents the electrolyte from leaking through the inlet and outlet of the air flow path. When the two air batteries A5 and A5 are stacked together as shown in FIG. 5, these upper and lower-side air batteries A5 and A5 are electrically conducted and connected in series to each other by intimate contact of the large-diameter region 50C" of the anode material 50C of the upper-side air battery A5 with the fluid-tight air-permeable film 31 of the lower-side air battery A5.

Figure 6A:
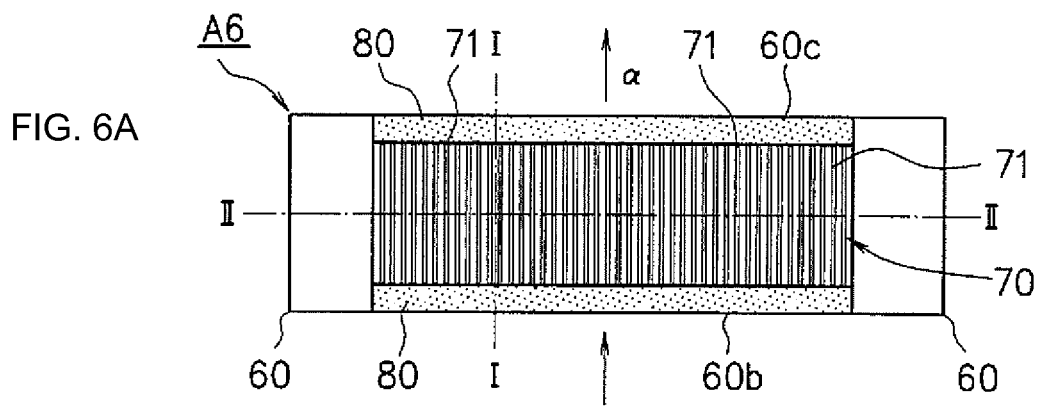
FIG. 6(A) is a plan view of an air battery according to a sixth embodiment of the present invention.
Figure 6B:
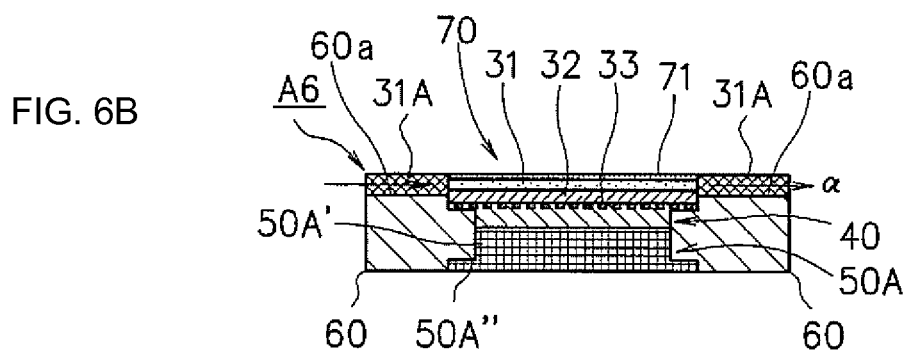
FIGS. 6(B) and 6(C) are cross-section views of the air battery taken along line I-I and line II-II of FIG. 6(A), respectively.
Figure 6C:
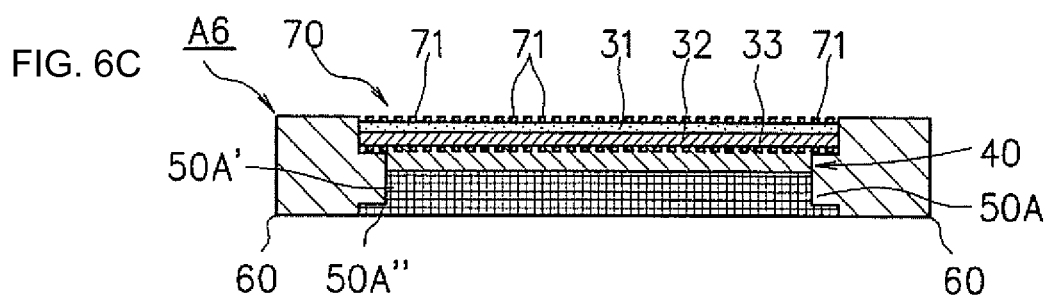

An air battery according to the sixth embodiment of the present invention will be explained below with reference to FIGS. 6A-6C. FIG. 6(A) is a plan view of an air battery according to the sixth embodiment of the present invention; and FIGS. 6(B) and 6(C) are cross-section views of the air battery taken along line I-I and line II-II of FIG. 6(A), respectively. In the sixth embodiment, parts and portions that are the same as or similar to those in the above-mentioned embodiments are designated by the same or similar reference numerals to avoid repeated explanations thereof.

The air battery A6 according to the sixth embodiment has a frame member 60 of rectangular frame shape when viewed in plan such that the cathode constituting member 30, the electrolyte and separator layer 40 and the anode material 50A are placed in the frame member 60. The air battery A6 also has a flow path forming member 70 and highly air-permeable seal members 80 and 80

The flow path forming member 70 is arranged on the conductive fluid-tight air-permeable film 31 of the cathode constituting member 30 and has a plurality of ribs 71 formed at regular intervals and extending in parallel to the direction of air flow α. In the sixth embodiment, the flow path forming member 70 has conductivity. The highly air-permeable seal members 80 and 80 are disposed on air inlet- and outlet-side surfaces 60b and 60c of the frame member 60 and, more specifically, in center portions of longitudinal-side upper end faces 60a and 60a of the frame member 60 so as to easily allow a flow of air.

The upper end faces 60a and 60a of the frame member 60, on which the highly air-permeable seal members 80 and 80 are disposed, are made lower in height than the flow path forming member 70. There is thus formed an air flow path between the upper- and lower-side air batteries A6 and A6 when the air batteries A6 and A6 are stacked together.

Figure 7A:
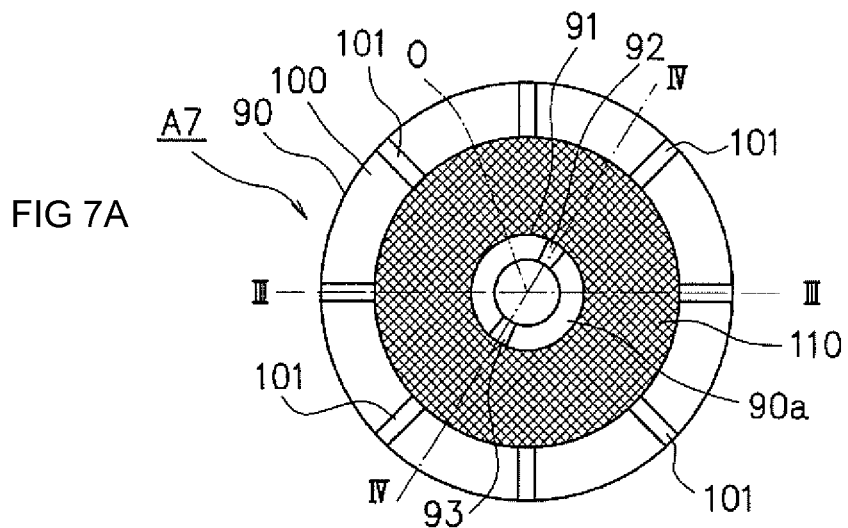
FIGS. 7(A) and 7(B) are a top view and a bottom view of an air battery according to a seventh embodiment of the present invention, respectively.
Figure 7B:
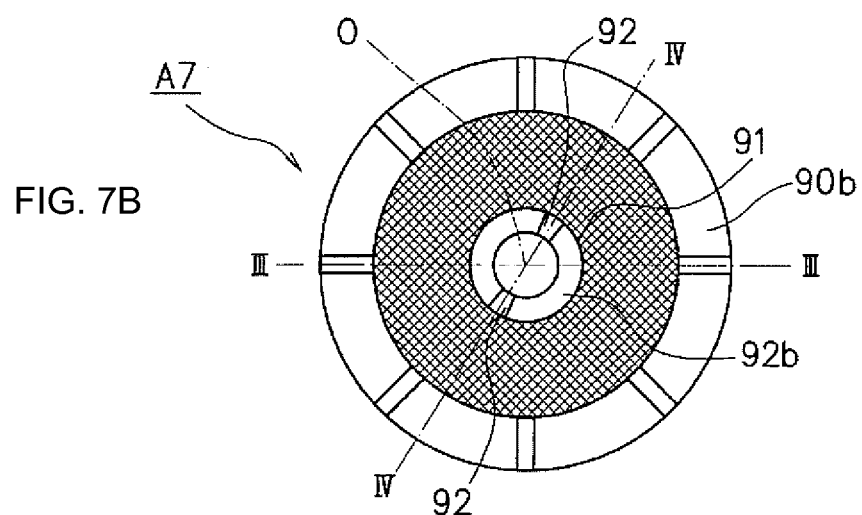
Figure 7C:
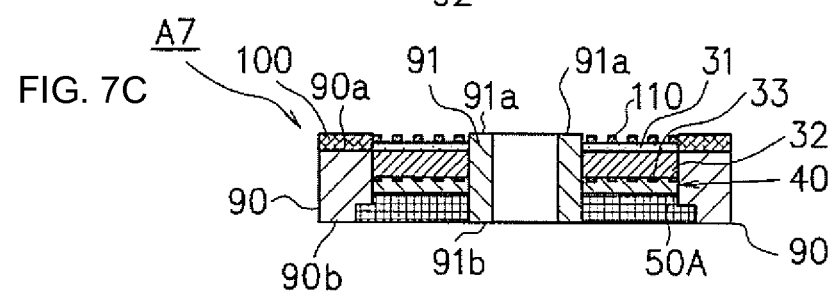
FIGS. 7(C) and 7(D) are cross-section views of the air battery taken along line III-III and line IV-IV of FIG. 7(A), respectively.
Figure 7D:
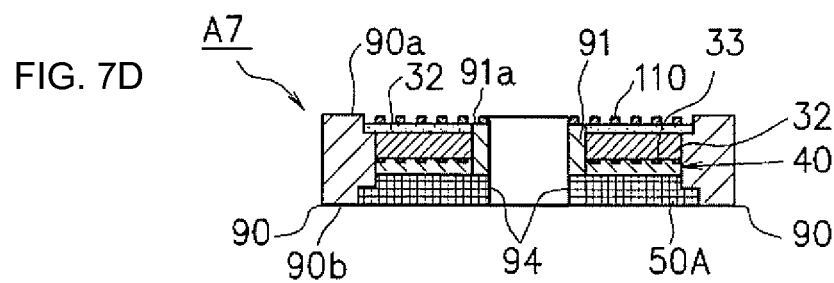

An air battery according to the seventh embodiment of the present invention will be explained below with reference to FIGS. 7A-7D. FIGS. 7(A) and 7(B) are a top view and a bottom view of an air battery according to the seventh embodiment of the present invention, respectively; and FIGS. 7(C) and 7(D) are cross-section views of the air battery taken along line III-III and line IV-IV of FIG. 7(A), respectively. In the seventh embodiment, parts and portions that are the same as or similar to those in the above-mentioned embodiments are designated by the same or similar reference numerals to avoid repeated explanations thereof.

The air battery A7 according to the seventh embodiment has an outer frame 90 of ring shape when viewed in plane, an air introduction tube 91 of smaller diameter than the outer frame 90 and a flow path forming member 110. The outer frame 90 and the air introduction tube 91 are coaxially arranged about the axis O. The contact member 20, the flow path forming member 110, the cathode constituting member 30, the electrolyte and separator layer 40 and the anode material 50 are stacked together and placed in an inner space between the outer frame 90 and the air introduction tube 91.

Further, the air battery A7 has a highly air-permeable seal member 100 located on an upper end face 90a of the outer frame 90. The highly air-permeable seal member 100 has a thick annular shape with a predetermined height and with inner and outer diameters equal to those of the outer frame 90 so as to surround the fluid-tight air-permeable film 31. Air flow grooves 101 are made in the highly air-permeable seal member 100 at predetermined angular intervals about the axis O so as to provide air communication between the inside and outside of the outer frame 90.

As shown in FIG. 7(C), an upper end face 91a of the air introduction tube 91 is at the same height as the highly air-permeable seal member 100. Air introduction grooves 92 are made in the upper end face 91a of the air introduction tube 91 so as to extend along a diameter line across the axis O. Air introduction grooves 94 are also made in a lower end face 91b of the air introduction tube 91 so as to extend along a diameter line across the axis O.

The flow path forming member 110 is arranged on the conductive fluid-tight air-permeable film 31 of the cathode constituting member 30 and has a plurality of ribs formed radially about the axis O so as to allow a smooth flow of air from the air introduction groove 92 to the air flow grooves 101.

Although the embodiments of the present invention have been described in detail above, the features of the respective embodiments are not limited to the above applications. The feature or features of any one of the embodiments may be applied, with or without modification, to any other one of the embodiments. It is feasible to combine any of the features of the above embodiments.

The invention claimed is:

1. A battery pack, comprising:
a plurality of air batteries stacked together, each air battery comprising:
an anode having an anode active material;
a cathode constituting member with cathode active material, a cathode collector, and a conductive fluid-tight air-permeable film; and
a frame member surrounding an outer circumference of the anode and the cathode constituting member, wherein a surface of the conductive fluid-tight air-permeable film of the cathode constituting member is flush with one open end of the frame member and a surface of the anode active material of the anode is flush with or slightly protrudes from an other open end of the frame member, wherein the anode active material of one air battery is brought into direct contact with the conductive fluid-tight air-permeable film of the cathode constituting member of an adjacent air battery when stacked.

2. The battery pack according to claim 1, wherein the anode active material of each air battery has a cross-sectional area gradually or stepwisely increasing from the cathode constituting member toward the cathode constituting member of the adjacent air battery.

3. The battery pack according to claim 1, wherein the conductive fluid-tight air-permeable film of the cathode constituting member of the one air battery has a surface area larger than that of the anode active material of the adjacent air battery.

4. The battery pack according to claim 1, wherein each air battery further comprises:

an air flow path formed at an interface between the anode active material and the conductive fluid-tight air-permeable film; and another fluid-tight air-permeable film having higher air permeability than that of the fluid-tight air-permeable film of the cathode constituting member and disposed on an inlet and an outlet of the air flow path.

5. The battery pack according to claim 1, wherein the frame member is formed with air flow holes for air supply to the fluid-tight air-permeable film.

* * * * *